US010397076B2

(12) United States Patent
Griffith et al.

(10) Patent No.: US 10,397,076 B2
(45) Date of Patent: *Aug. 27, 2019

(54) PREDICTING HARDWARE FAILURES IN A SERVER

(71) Applicant: International Business Machines Corporation, Armonk, NY (US)

(72) Inventors: Douglas J. Griffith, Spicewood, TX (US); Angela A. Jaehde, Austin, TX (US); Manjunath B. Muttur, Kolar Gold Fields (IN); Deepti Umarani, Belgaum (IN)

(73) Assignee: International Business Machines Corporation, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/171,422

(22) Filed: Jun. 2, 2016

(65) Prior Publication Data

US 2016/0277260 A1 Sep. 22, 2016

Related U.S. Application Data

(63) Continuation of application No. 14/225,541, filed on Mar. 26, 2014, now Pat. No. 9,450,833.

(51) Int. Cl.
*G06F 11/34* (2006.01)
*H04L 12/26* (2006.01)
*H04L 12/24* (2006.01)

(52) U.S. Cl.
CPC ........ *H04L 43/065* (2013.01); *G06F 11/3447* (2013.01); *G06F 11/3452* (2013.01); *H04L 41/147* (2013.01); *H04L 43/0817* (2013.01)

(58) Field of Classification Search
None
See application file for complete search history.

(56) References Cited

U.S. PATENT DOCUMENTS 6,226,597 B1 5/2001 Eastman et al.
7,539,907 B1 5/2009 Johnsen et al.
(Continued)

FOREIGN PATENT DOCUMENTS

| EP | 0402403 B1 | 4/1992 | |
|---|---|---|---|
| EP | 1109101 A3 | 8/2002 | |
| WO | WO 2012025938 A1 * | 3/2012 | .......... G06F 11/3062 |

OTHER PUBLICATIONS

Calinescu et al., "Dynamic QoS Management and Optimization in Service-Based Systems", IEEE Transactions on Software Engineering, vol. 37, No. 3, May/Jun. 2011, pp. 387-409, © 2011 IEEE.

(Continued)

*Primary Examiner* — Yolanda L Wilson
(74) *Attorney, Agent, or Firm* — Stephen R. Yoder (57) ABSTRACT

A computer system is monitored for conditions bearing on the effective age of various hardware components of the system. Upon detecting an age adjustment condition, the affected hardware components are identified. An age adjustment is determined for each of the affected hardware components. The adjusted age is stored for reference when taking actions based on the adjusted age, such a component replacement and/or workload placement.

12 Claims, 5 Drawing Sheets

(56) References Cited

U.S. PATENT DOCUMENTS

| | | | |
|---|---|---|---|
| 8,275,642 B2* | 9/2012 | Chan | G06Q 10/06 702/181 |
| 8,959,401 B2* | 2/2015 | Kato | G06Q 10/02 714/47.3 |
| 2002/0010613 A1* | 1/2002 | Lallo | G06Q 10/20 705/304 |
| 2005/0005186 A1* | 1/2005 | Goebel | G06Q 10/06 714/1 |
| 2005/0193227 A1* | 9/2005 | Nakahara | G06F 11/203 714/4.1 |
| 2008/0278755 A1* | 11/2008 | Martin | G03G 15/5075 358/1.16 |
| 2009/0210081 A1* | 8/2009 | Sustaeta | G05B 13/0285 700/99 |
| 2010/0083049 A1* | 4/2010 | Miki | G06F 1/28 714/38.13 |
| 2011/0047421 A1 | 2/2011 | Schuette | |
| 2011/0258363 A1* | 10/2011 | Doatmas | G06F 3/0616 711/103 |
| 2012/0116696 A1 | 5/2012 | Wank | |
| 2012/0245891 A1 | 9/2012 | Nishikawa et al. | |
| 2013/0031424 A1 | 1/2013 | Srivastava et al. | |
| 2013/0097304 A1 | 4/2013 | Asthana et al. | |
| 2014/0298113 A1* | 10/2014 | Sakurai | G06F 11/2025 714/47.3 |
| 2014/0359363 A1* | 12/2014 | Biem | G06F 11/3024 714/37 |
| 2015/0281015 A1 | 10/2015 | Griffith et al. | |
| 2015/0331775 A1* | 11/2015 | Slik | G06F 11/008 714/6.23 |

OTHER PUBLICATIONS

Greenan et al., "Mean time to meaningless: MTTDL, Markov models, and storage system reliability", Hot Storage 10, 2nd Workshop on Hot Topics in Storage and File Systems, Boston, MA, Jun. 2010, pp. 1-5.

Li et al., "Failure event prediction using the Cox proportional hazard model driven by frequent failure signatures", IIE Transactions (2007) 39, pp. 303-315, Copyright © "11E", ISSN: 0740-817X print / 1545-8830 online, DOI: 10.1080107408170600847168, Received Aug. 2005 and accepted Jan. 2006.

Wang et al., "A Hierarchical Reliability Model of Service-Based Software System", 2009 33rd Annual IEEE International Computer Software and Applications Conference, © 2009 IEEE, pp. 199-208.

"Bathtub curve", Wikipedia, the free encyclopedia, page last modified on Jan. 6, 2014 at 09:20, <http://en.wikipedia.org/wiki/Bathtub_curve>.

"Burn-in", Wikipedia, the free encyclopedia, page last modified on Jul. 9, 2013 at 20:31, <http://en.wikipedia.org/wiki/Burn-in>.

"Failure Modes and Effects Analysis (FMEA) and Failure Modes, Effects and Criticality Analysis (FMECA)", Reliability Engineering Resources, provided in Main Idea for disclosure on Nov. 29, 2013, Copyright © 1992—2014 ReliaSoft Corporation, <http://www.weibull.com/basics/fmea.htm>.

"RCM++: Reliability Centered Maintenance (RCM) Software", Putting the reliability back into reliability centered maintenance™, Latest Release 9.0.4, Jan. 10, 2014, <http://www.reliasoft.com/rGm/index.htm>.

"S.M.A.R.T.", Wikipedia, the free encyclopedia, page last modified on Jan. 18, 2014 at 15:07, <http://en.wikipedia.org/wiki/S.M.A.R.T>.

"The Applicability of Markov Analysis Methods to Reliability, Maintainability, and Safety", START 2003-2, MARKOV, START, Selected Topics in Assurance Related Technologies, A publication of the Reliability Analysis Center, vol. 10, No. 2, pp. 1-8.

"Weilbull Distribution" Wikipedia, the free encyclopedia, page last modified on Jan. 20, 2014 at 06:23, <http://en.wikipedia.org/wiki/Weibull_chart>.

"Welcome to weibull.com Reliability Engineering Resource Website", Copyright © 1992-2014 ReliaSoft Corporation, <http://www.weibull.com/>.

Appendix P.: List of IBM Patents or Patent Applications Treated as Related, 2 pages.

* cited by examiner

PREDICTING HARDWARE FAILURES IN A SERVER

FIELD OF THE INVENTION

The present invention relates generally to the field of preventive maintenance, and more particularly to predicting hardware failures in a computing system.

BACKGROUND OF THE INVENTION

Device aging is an irreversible process inherent to many, if not all, computer hardware and system technologies. Electromigration plays a role in the degradation of tungsten contacts between transistors, logic gates, interconnects, capacitors, resistors, inductors, and transistor delays. Power characteristics deteriorate as a consequence of Hotcarrier-Induced (HCI) and Negative Bias Temperature Instability (NBTI) effects. Mild overclocking and other events, such as fan failure, which may result in over temperature, and events where overvolting may take place in a server cause an immediate physical damage to the CPU (central processing unit) processor. High clock speeds, high temperatures, and over-voltages are known to accelerate the aging of transistors.

Common causes of failure due to aging include: (i) material fatigue; (ii) change in frequencies of crystal clocks; (iii) loss in ability of flash memory to rewrite data; (iv) changes in frequency response of fiber bandwidth; (v) de-magnetization of some components of magnetic disks; and (vi) dust build up. Simply stated, hardware components wear down over time.

SUMMARY

Embodiments of the present invention disclose a method, computer program product, and system for estimating a remaining life expectancy value for hardware components used in a computing system. A first computing system detects an age adjustment condition during the operation of the computing system. The first computing system determines a set of hardware components in the computing system, each hardware component having a corresponding current life expectancy value affected by the age adjustment condition. The first computing system adjusts the corresponding current life expectancy value of each hardware component in the set of hardware components to a reduced life expectancy value based, at least in part, on the age adjustment condition. The first computing system generates a health report for a first hardware component in the set of hardware components.

DETAILED DESCRIPTION

A computing system is monitored for conditions bearing on the effective age of various hardware components of the system. Upon detecting an age adjustment condition, the affected hardware components are identified. An age adjustment is determined for each of the affected hardware components. The adjusted age is stored for reference in taking actions based on the adjusted age, such a component replacement and/or workload placement. The present invention may be a system, a method, and/or a computer program product. The computer program product may include a computer readable storage medium (or media) having computer readable program instructions thereon for causing electronic circuitry to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
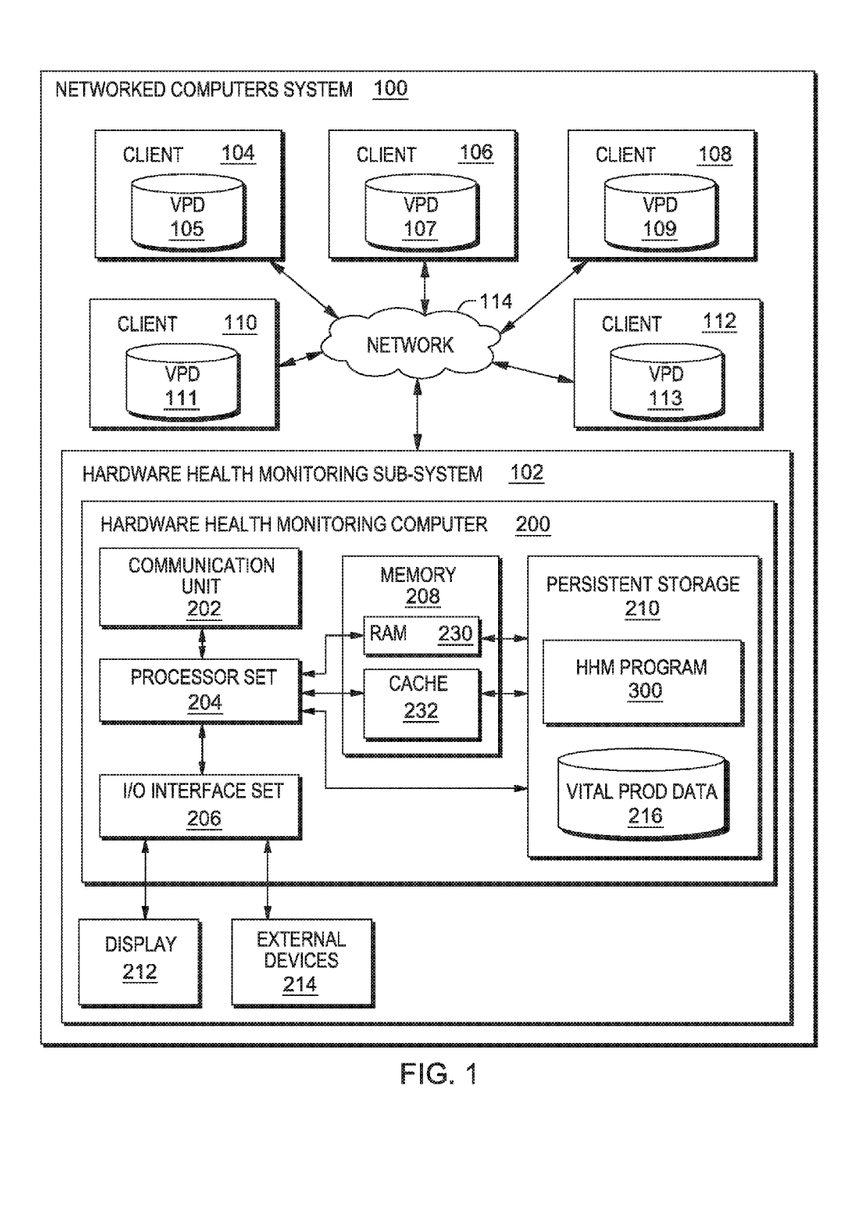
FIG. 1 is a schematic view of a first embodiment of a networked computers system according to the present invention.

The present invention will now be described in detail with reference to the Figures. FIG. 1 is a functional block diagram illustrating a networked computers system, generally designated 100, in accordance with one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: hardware health monitoring (HHM) sub-system 102; client sub-systems 104, 106, 108, 110, 112; vital product databases 105, 107, 109, 111, 113, and 216; communication network 114; HHM computer 200; communication unit 202; processor set 204; input/output (I/O) interface set 206; memory device 208; persistent storage device 210; display device 212; external device set 214; random access memory (RAM) devices 230; cache memory device 232; and HHM program 300.

HHM sub-system 102 is, in many respects, representative of the various computer sub-system(s) in the present invention. Accordingly, several portions of HHM sub-system 102 will now be discussed in the following paragraphs.

HHM sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. HHM program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between computer sub-systems.

HHM sub-system 102 is shown as a block diagram with many double arrows. These double arrows (no separate reference numerals) represent a communications fabric, which provides communications between various components of HHM sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for HHM sub-system 102; and/or (ii) devices external to HHM sub-system 102 may be able to provide memory for HHM sub-system 102.

HHM program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

HHM program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

HHM program 300 operates to monitor a computing system, such as client sub-system 104, for conditions bearing on the effective age of various hardware components of the sub-system. For each age adjustment condition that is detected, an age adjustment is determined for the associated hardware component(s). The adjusted age is stored for taking actions according to the adjusted age, such as component replacement and workload allocation, or workload placement.

Some embodiments of the present invention recognize the following facts, potential problems and/or potential areas for improvement with respect to the current state of the art: (i) detailed failure analysis carried out on many failed power server components as part of hardware system testing consistently reveals that component age is not the only deciding factor for the end of life of any hardware component; (ii) many times, a newer hardware component fails faster than older hardware components of the same type; (iii) knowing the date of manufacture does not necessarily support the prediction of hardware failures; and/or (iv) it really depends on the usage history, power supply changes, and the types of physical stress subjected to the hardware component throughout its lifetime.

Apart from the increased usage and time-induced material deterioration caused by factors mentioned above, there are other events or actions that affect the life expectancy of hardware components including: (i) the variations in thermal characteristics of the machine each time the hardware component is in use; (ii) the number of times the hardware is removed or added from the machine (add/remove operations); (iii) voltage changes during the usage of the component; (iv) frequency changes during the usage of the component; (v) power supply changes, such as input power fluctuation events or power resets on a slot or a machine; (vi) user misconfiguration scenarios, such as improper seating, improper cabling, abrupt remove/add while the corresponding slot is powered on; (vii) environmental changes including, but not limited to: over temperature warnings, hot reboots, shock warnings, and failure of multiple critical components simultaneously (an indication of accidental damage to hardware); and/or (viii) error injections, such as test procedures that simulate error conditions by injecting data or address parity errors to verify recovery procedures. Any of the above mentioned events and/or actions are stressful and have the effect of reducing the life expectancy of the corresponding hardware.

In some embodiments of the present invention, the HHM program starts up during system boot time and runs in the background whenever the system is lightly loaded. In other embodiments, the HHM program is initiated by a user on-demand. Regardless of the way that the HHM program is started and how it runs, in the background, or otherwise, the HHM program detects any of the above mentioned events by taking actions including, but not limited to: (i) monitoring the usage levels of all hardware components; (ii) checking the error logs; (iii) checking the hardware traces; (iv) checking the performance statistics; and/or (v) checking the thermal parameters.

Furthermore, the HHM program monitors the progress and results of the dynamic operations such as add, remove, replace operations that are performed on any hardware component. Some embodiments of the present invention record observation data for any anomalies during the procedure with respect to: (i) behavior of the hardware; and/or (ii) user errors occurred during the procedure. The HHM program records the observation data and saves the information in an observations database.

Some embodiments of the present invention use the observation data stored for each hardware component to build a health report of any particular hardware component to share with other applications or users. When a particular hardware component is being replaced or removed, some embodiments of the present invention store the health report for that hardware component in a central database (not shown) for sharing the health report with another system (not shown) when the hardware component is installed in that system. Vital product data (VPD) 105, 107, 109, 111, 113, and 216 (see FIG. 1) is the information repository of each device in each computer sub-system. The VPD stores information including: (i) device characteristics; (ii) device specifications; (iii) device serial number; and/or (iv) part numbers. This information is available for users to query and use in the applications.

Some embodiments of the present invention store the health reports of hardware components in the VPD of the machine, in that way, the health report is transferable with the hardware whenever it is installed on a different machine. In this embodiment, the VPD is stored in persistent storage 210. Alternatively, the VPD is stored in RAM 208 for quicker access to data than when stored in the persistent storage. Alternatively, a hardware specific VPD is stored in the corresponding hardware component memory. The health report, as stored in the VPD, may also be referred to as the health and life expectancy VPD.

The HHM program maintains cross-reference information for the various hardware components in a given machine and updates the corresponding VPD with the adjusted age, or other life expectancy indicator, of each hardware component as health related activities occur. The VPD has limited storage space based on a pre-configured buffer size. Persistent storage space available for the VPD is typically limited. The health and life expectancy related VPD may be stored in various abbreviated or compressed ways. For example, the cumulative time that a component spends in a given state may be stored in the VPD instead of each individual occurrence. For another example, the models may be referred to by an index instead of by being described by a meta-language.

Some embodiments of the present invention continuously update the adjusted age of a given hardware component by taking into account many types of life expectancy events detected during monitoring activity performed by the HHM program. A formula or algorithm is applied to observation data recorded for hardware-related stressful events to dynamically recalculate the adjusted age of each hardware component. For example, every time a hardware component fails, the HHM program performs statistical analysis on the operational data accumulated for that piece of hardware. The HHM program takes into account operational data that may include one, or more, of the following: (i) time to failure; (ii) normal usage cycles; (iii) abnormal usage counts; (iv) thermal event time periods; (v) shocks; and/or (vi) cabling change counts.

Some embodiments of the present invention consider a set of parameters when determining the overall age of hardware components. Each of the parameters has an associated weight that denotes the extent to which the parameter affects the age adjustment value. Example default weights are presented in Table 1, below:

TABLE 1

Parameter weighing scheme for age adjustment determination

| PARAMETER | WEIGHT |
|---|---|
| Normal Operational Cycles, (a) | 1 second |
| Misconfiguration, (b) | 1 month |
| Thermal Events of 1 Second, (c) | 30 minutes |
| Environmental Events, (d) | 30 minutes |

Having the default weights, one example formula for calculating the age adjustment factor, X, follows:

$$X=(a*1\text{ second})-(b*1\text{ month})-(c*30\text{ minutes})-(d*30\text{ minutes}),$$

where each parameter (a, b, c, and d) reflects the total number of occurrences over the monitored time period.

With each failure, the HHM program analyzes the values of each of the parameters affecting the age adjustment factor and makes appropriate adjustments to the various parameter weights according to the time to reach a failure. For example: a CPU may fail after operating for a long period of time. The total number of occurrences accumulated during monitoring for parameters a and d may be high, while the number of occurrences accumulated for parameter c is low. If the failure event is detected soon after a small increase in the occurrence of parameter c, the HHM program will increase the weight of parameter c and reduce the weights of parameters a and b. Accordingly, the weights associated with the parameters affecting the age are refined and corrected to reflect the real impact that the parameter has on the age of the hardware component. In some embodiments of the present invention, the changes to parameter weights according to this learned knowledge is shared across all participating machines by HHM program.

This disclosure does not purport to predict the exact point in time when a device will fail because such considerations are probabilistic. The adjusted age of a component is based on a statistical model, which expresses the likelihood of the component to fail within a future period of time (days, months or hours of operation). Based on statistics, one can arrive at a model for the adjusted age of a component. While the term age implies a progressively higher likelihood to fail with increasing hours of operation, this is not necessarily true. For example, the likelihood to fail is oftentimes higher during initial operation and then remains constantly low for a long time thereafter. The reason for this observed behavior is that any manufacturing errors or out of tolerance conditions that were not found by tests during hardware production will show up during the first hours of operation of the component. These first hours of operation are sometimes referred to as the burn-in period.

Reliability standards often require a component to have passed the burn-in period, in emulated operating conditions, before being deployed, particularly for critical equipment in applications such as: (i) military; (ii) air travel; and/or (iii) power plants. Similarly, the components of hardware modules newly added to a frame are oftentimes considered to have an above average failure likelihood for the first hours of operation such that during those first hours of operation they are deployed in non-mission critical application (for example, a logical partition hosting in-house development as opposed to a production database). Though the terms "age" and "life expectancy" are commonly used in the art, what those terms really describe is the likelihood of failure within a given time period. Accordingly, that is how these terms are used herein.

Models for the likelihood of failure are derived from empirical data and statistical analysis performed on the empirical data to identify factors that affect the life expectancy of a device. Operating a central processing unit (CPU) outside its optimal thermal and/or frequency envelope will increase the likelihood of a failure, essentially reducing its life expectancy. Exactly how much and what formula, or curve, best models the effect of these factors on the likelihood of failure is the subject of statistical analysis. Techniques to find statistical correlation between two events involve a long established area of research. For the purpose of this disclosure, no specific model is used, but only reference is made to these known models and techniques to arrive at correlations between factors. They include: (i) proportional hazard models; (ii) the Cox model; (iii) the Weibull model; (iv) parametric proportional hazards models; and/or (v) the Poisson model.

Reliability models incorporated into computer architectures are abundant in the art. Examples include: (i) redundant array of independent disks (RAID) design; (ii) models for service reliability in clouds; (iii) dynamic reliability profiles; and (iv) the Markov model. The present invention collects and tracks data corresponding to individual hardware components across data centers, parts replacement, and machine reconfigurations. The tracked data includes: (i) age data; and (ii) reliability data.

Figure 2:
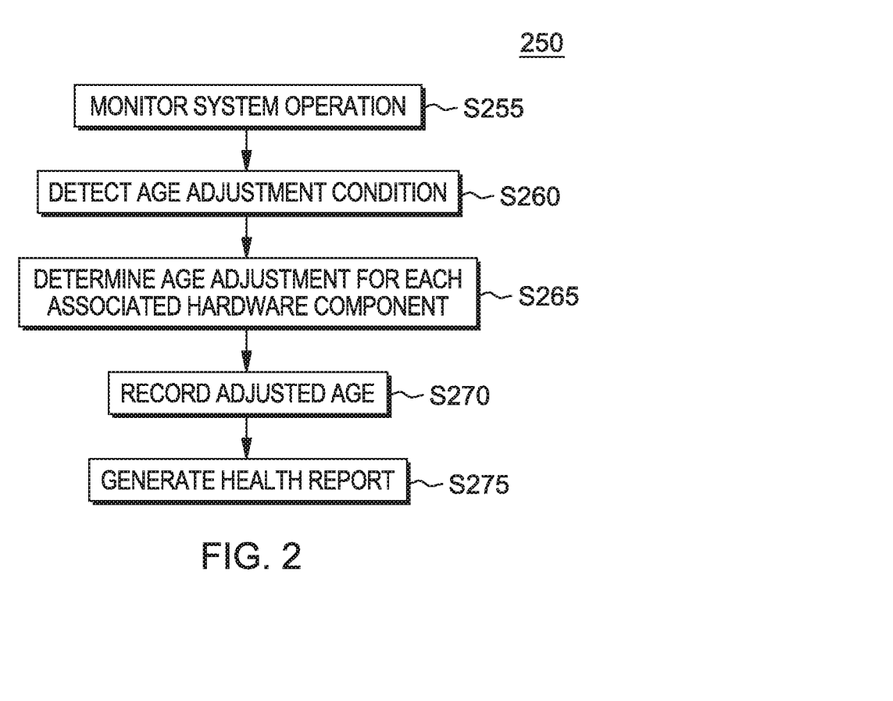
FIG. 2 is a flowchart showing a method performed, at least in part, by the first embodiment networked computers system.
Figure 3:
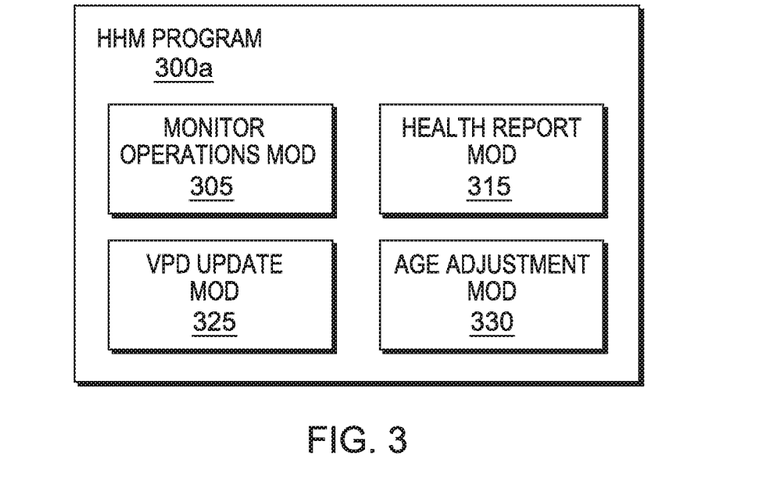
FIG. 3 is a schematic view of a machine logic (for example, software) portion of the first embodiment networked computers system.

FIG. 2 shows flowchart 250 depicting a first method according to the present invention. FIG. 3 shows program 300a for performing at least some of the method steps of flowchart 250. Program 300a is one embodiment of program 300 shown in FIG. 1. This method and associated software will now be discussed, over the course of the following paragraphs, with extensive reference to FIG. 2 (for the method step blocks) and FIG. 3 (for the software blocks).

Processing begins at step S255, where monitor operations module 305 monitors system operations for hardware component age adjustment conditions. In this embodiment, monitor operations module 305 monitors the health of client sub-systems 104, 106, 108, 110, and 112 (FIG. 1) by communicating over network 114 (FIG. 1). Alternatively, each sub-system in networked computers system 100 includes a monitor operations module that monitors the individual sub-system for age adjustment conditions.

Monitor operations module 305 detects age adjustment conditions by taking actions including, but not limited to: (i) monitoring the usage levels of all hardware components; (ii) checking the error logs; (iii) checking the hardware traces; (iv) checking the performance statistics; and/or (v) checking the thermal parameters. Age adjustment conditions, as discussed further herein, include: (i) over-clocking; (ii) fan failure; (iii) over-volting; (iv) high clock speeds; (v) high temperatures; (vi) power supply changes; (vii) variations in thermal conditions; (viii) removal of hardware; (ix) addition of hardware; (x) voltage changes; (xi) frequency changes; (xii) input power fluctuations; (xiii) power resets; (xiv) hardware misconfigurations; (xv) improper seating of hardware components; (xvi) improper cabling; (xvii) hot reboots; (xviii) shock warnings; (xix) over-temperature warnings; (xx) simultaneous failure of multiple components; (xxi) error injections; (xxii) hardware repairs; (xxiii) cumulative usage times; (xxiv) abnormal shut-downs; (xxv) service actions; (xxvi) link stabilization time; (xxvii) hard disk motor failure; (xxviii) clogged air intake filter; (xxix) malfunctioning air intake filter; and/or (xxx) power cycling while partitions are up and running.

Processing proceeds to step S260, where monitor operations module 305 detects an age adjustment condition. As discussed herein, when an age adjustment condition occurs, multiple hardware components may be affected. Module 305 determines the hardware components associated with the age adjustment condition in such a way that an age adjustment may apply. The monitor operations mod maintains the cross-reference information to be used in determining the associated hardware components. For example, monitor operations mod has cross-reference information that the CPU is physically located nearby the memory DIMMs so that a detected over-temperature condition at the CPU will involve an age adjustment for both the CPU and the corresponding DIMMs.

Processing proceeds to step S265, where age adjustment module 330 determines the age adjustment for each associated hardware component. Age adjustment is discussed in more detail below with examples. The precise age adjustment depends on the tolerance of each system being monitored. A predetermined age adjustment count is associated with each failure mode for which monitor operations mod 305 is monitoring. In the example below, operational cycles, are the unit of measure for the age of the hardware component. Alternatively, units of measure for the age of hardware components include, but are not limited to: (i) operational cycles (such as Read/Write, Input/Output, Frequency rate); (ii) power ON/OFF count; (iii) thermal overshoot time intervals; (iv) hot plug cycles; (v) shock events; and/or (vi) pressure events; (vii) misconfiguration event counts.

Processing proceeds to step S270, where vital product data (VPD) module 325 records the adjusted age in the corresponding vital product data file, such as VPD 105 of client sub-system 104. The hardware components of each system are accounted for in their corresponding VPD. In this example, VPD module 325 communicates through network 114 (FIG. 1) to update VPDs 105, 107, 109, 111, and 113. Alternatively, each client sub-system includes a VPD module for recording adjusted ages in the VPD of each corresponding client sub-system.

Processing ends at step S275, where health report module 315 generates a health report for each hardware component being monitored. In this example, a health report is generated at the time of each age adjustment action. The health report is stored in the VPD to support tracking components as they are removed and/or re-installed. In this example, the adjusted age data is transferable from one VPD to another as the hardware is removed from one system and installed in another. Alternatively, the health report is generated on-demand for viewing by a user, or it is generated periodically.

Further embodiments of the present invention are discussed in the paragraphs that follow and later with reference to FIGS. 4-7. A hardware component, such as an adapter board or power node already contains VPD in persistent storage. Observation data is added to the VPD in the form of an incident log as shown in Table 2.

TABLE 2

Incident Log.

| DATE | COMPONENT ID | INCIDENT | DURATION | INCIDENT TYPE |
|---|---|---|---|---|
| 10113 | DIMM_2 | TEMP > 50 F. | 50000 sec | #temperature incident |
| 10213 | CPU_4 | FREQ > x Hz | 30000 sec | #frequency incident |
| 20213 | — | UPDATE M1 | | #upload new model |

An example of the adjusted age history table corresponding to the incident log in Table 2 is shown in Table 3.

TABLE 3

Adjusted age history.

| COMPONENT ID | LIFETIME MODEL | ADJUSTED AGE (CYCLES) |
|---|---|---|
| DIMM_1 | M1 | 1000 |
| DIMM_1 | M2 | 2000 |
| DIMM_2 | M1 | 3000 |
| DIMM_2 | M2 | 5000 |
| CPU_1 | M3 | 2000 |
| CPU_1 | M4 | 4000 |

The health and life expectancy related VPD of the above example consists of two tables for each component according to multiple models: (i) an incident log; and (ii) an adjusted age record (or estimated life expectancy file). The health and life expectancy related data stored in the VPD is collectively referred to as observation data.

Some embodiments of the present invention provide a model for hardware component life expectancy that describes certain operating conditions, such as running with a specified frequency. In some embodiments of the present invention, the health monitor uploads a new model or changes an existing model as new data is collected and/or analyzed. For example, data collected via a call-home facility from many servers may predict that a certain CPU type will have a certain failure likelihood if overheated for a certain amount of time. Accordingly, the HHM program uploads a new model and adds it to the table of estimated life expectancies or updates the life expectancies of an existing model.

Many computers provide features or functions to dynamically add/remove/replace various hardware components in the machine. Such features are part of a high availability (HA) portfolio to help users perform hardware maintenance without having to power off the servers. In some embodiments of the present invention, the dynamic field replaceable unit repair operation, when initiated through the operating system, is tracked using the HHM program. The HHM program detects any hardware repair procedure initiated by the users and monitors its progress by looking for: (i) errors; and/or (ii) incorrect add/remove at the wrong step during the repair procedure. At the end of the operation, HHM program logs the results by incrementing the count of repair procedures and recoding any anomalies against the corresponding hardware serial number or part number in the observations database.

Some embodiments of the present invention track dynamic device reconfigurations. For example, on a power platform, the HHM program interacts with the hot repair or upgrade utility on the hardware management console to gather observation data about the progress and results of the dynamic field replaceable unit repair operation. The HHM program receives observation data including: (i) replacements that took place; (ii) how many times a card had been inserted into a slot; and/or (iii) errors detected by the hot repair or upgrade utility that occurred during replacement. At the end of the dynamic replace operation, the HHDM logs the results by incrementing the count of repair procedures and recording any anomalies against the corresponding hardware SN/PN in the observations database.

The device driver for a hardware component is responsible for driving the sequence of operations that involve physical manipulations in the form of electrical/magnetic signals through bits capable of being: (i) stored; (ii) transferred; (iii) combined; (iv) compared; and/or (v) manipulated. Some embodiments of the present invention, record, via the device driver, the durations of each of the operations. Some embodiments of the present invention apply the duration for a new operation to the existing operations data applied to a given hardware component to sum up the period of time that operation is performed. Further, the device driver adds all of the durations of the operations to determine the total period of time reflecting the overall summed operations after the end of each request to operate on the device.

Operating systems oftentimes track cumulative processor and/or memory usage, keeping statistics including: (i) the time a processor or dual in-line memory module (DIMM) is active in a partition; (ii) the number of transitions of a CPU from hibernation to operational; and/or (iii) the number of electrical power on/off cycles (these cycles stress the power infrastructure itself). In some embodiments of the present invention, the cumulative usage data is one form of observations data that is stored and updated on the device internal memory or on the system VPD in the case of hardware components that do not have internal memory such as: (i) processors; (ii) memory DIMMs; (iii) fans; and/or (iv) I/O adapters.

Sometimes mild over-clocking or fan failure causes over temperature or over-volting to take place in a server. Events such as high clock speeds, high temperatures, and high voltages are known to accelerate transistor aging. CPUs that experience such events are likely to fail sooner than other CPUs that have experienced such events. Device drivers record the duration of states of extreme clock speeds, temperatures, and/or voltages in a CPU as an independent parameter. Because CPUs are located near the memory DIMMs in most servers, an over-temperature event alters the life expectancy of DIMMs through accelerated aging. There exist many scenarios where events at one component may indirectly affect the health, or life expectancy, of other components, including: (i) abnormal shutdown; (ii) service action on a bulk power regulator (BPR) in high end power servers can indirectly affect the life expectancy of memory DIMM as the power fluctuations caused by that event will affect all components whose power is regulated by that particular BPR; (iii) an improper dynamic repair procedure performed on, for example, slot 1 of a bulk power assembly, can affect the life expectancy of a device in, for example, slot 2 of the bulk power assembly, where slot 1 and slot 2 share the same local computer bus and they both sit on the same firmware; and/or (iv) a service action to install or remove an I/O adapter can affect the PCI (peripheral component interconnect) slot health as the link up/down events cause changes in power utilization that create a hostile environment that reduces the life expectancy of the PCI slot.

Some embodiments of the present invention use age data for hardware components and the duration parameter of extreme CPU conditions to predict hardware failures. The impact of accelerated aging is minimized by deploying critical apps or data on least aged or least failure prone hardware. Some embodiments of the present invention employ a thermal and power management device (TPMD) in the HHM program system to fetch the thermal sensor readings and voltage readings for each processor periodically. When the temperature and/or voltage levels on the processors or DIMMs exceed a threshold value, the TPMD updates the incident log file, or observation data. The TPMD has access to each processor's specifications for: (i) frequency; (ii) voltage; (iii) thermal levels; and/or (iv) fan speeds.

The time required for stabilization of a connection after, for example, exchanging cables or removing an endpoint device is indicative of the age of the associated hardware components, including: (i) optical links; and/or (ii) hardware to generate signals. Various techniques exist for testing line quality using signal response. Further, the time the adapter hardware requires to establish a link applies extra stress to the associated hardware components. For example, if an adapter takes a prolonged amount of time attempting to establish a link and eventually fails to establish the link due to a defective cable, a measure of the duration of link stabilization is recorded as a factor of the life expectancy model of the associated hardware component.

Some embodiments of the present invention periodically update a central life expectancy database with reports of health and life expectancy related VPD for use by a data mining facility. Additionally, the HHM program may further inform the user of a component failure. The data mining facility incorporates the reported observation data into statistical models to correlate life expectancy with recorded events. The data mining facility yields results that may include one, or more of the following: (i) a specific failure likelihood curve for components with serial numbers in the range from x to y (which might be caused by some abnormality during hardware manufacturing); and or (ii) an improved failure likelihood model for a component as a function of the time it spent outside its normal operating frequency and/or thermal envelope. Upon deriving a new model for the failure likelihood of a component, the central database and/or data mining facility push the new model to those HHM program systems that have subscribed to receive updates. Upon receipt of the new model, the HHM program updates the health and life expectancy related VPD of the corresponding components. The evolution of the health and life expectancy model for a given component may begin with a standard model (a bathtub curve, or similar) derived from data during hardware test or the standard model from the predecessor of that component, if it is has similar characteristics. Over time, as data is collected, a more accurate life expectancy model is developed.

Some embodiments of the present invention, externalize information about the life expectancy of individual hardware components by means of an API to be utilized for workload placement. Workload placement refers to the allocation of workloads within a networked computers system. Operating systems use this information in one, or more, of the following ways: (i) the operating system implements reliability tiers for partitions and uses information about the life expectancy of a component to assign each component to a given partition (for example, it might assign CPUs and memory with diminished life expectancy to a partition having a low reliability rating and the administrator might use that partition for development and/or testing purposes); (ii) adapter cards with diminished life expectancy may be assigned to development and/or test partitions; (iii) adapter cards with diminished life expectancy may be spread across multipath devices in such a way that each multipath device contains at least a minimum number of hardware paths with good life expectancy; and/or (iv) rules that take into account the health and life expectancy of a component may be combined with other aspects, such as affinity placement, to formulate an optimization goal for the assignment of hardware components to a partition.

Another issue that is commonly encountered with hardware failure is hard disk failure. The most common cause of hard-disk failure is a head crash. The head crash event occurs when the internal read/write head of the device, usually just hovering above the magnetic data storage surface, touches a platter, or scratches the magnetic data storage surface. Hard disk failure may occur when: (i) the electric motor, which allows the platter to spin, fails due to bad bearings or other components; (ii) the air intake filter is clogged; (iii) the air intake filter isn't working properly; (iv) extreme heat generated while running causes the electronic circuit board to fail; and/or (v) a sudden power failure while the disk is writing caused by power cycling of the system while the partitions are up and running. Some embodiments of the present invention calculate the adjusted age based, at least in part, on device driver error logs that record the above-mentioned events and/or errors.

Some embodiments of the present invention employ a criticality program (not shown) in the HHM program for each application for managing a criticality parity, or, simply, criticality, so that the operating system is able to determine: (i) the least-aged CPUs for execution of critical programs; and (ii) the least-used storage devices to store critical data. Depending upon the value of the criticality parity, the OS schedules the applications on appropriate hardware and stores the data on appropriate disks. If the criticality is set too high, then the OS can schedule the process on the least-used CPUs and store the corresponding data on a disk with the highest life expectancy. When the critical data is stored in the least-aged memory of available hard drives, the criticality program must save the data as critical so that the operating system knows it is critical data.

In some embodiments of the present invention, after each hardware access operation, observation data is logged for the particular hardware component in the observations database. The observation data is used to determine the adjusted age of that particular hardware component. Each type of event which affects the life expectancy of hardware components is assigned a count according to how much the life expectancy changes for each affected hardware component. Factors that are assigned counts include: (i) over temperature; (ii) abnormal shutdown; and/or (iii) incorrect seating. Whenever a life-expectancy reducing event is detected for a particular hardware component, the adjusted age of that hardware component is reduced by the corresponding count for that event.

A typical formula to calculate the adjusted age based on observation data follows. Knowing the approximate life expectancy of a hardware component under normal, or ideal, usage conditions, referred to as the "ideal age," adjusted age is calculated as the ideal age less any counts for: (i) abnormal usage; (ii) abnormal thermal data; and/or (iii) abnormal hardware events. The adjusted age is cumulative and is adjusted down for each factor-based count according to observed data.

Figure 4:
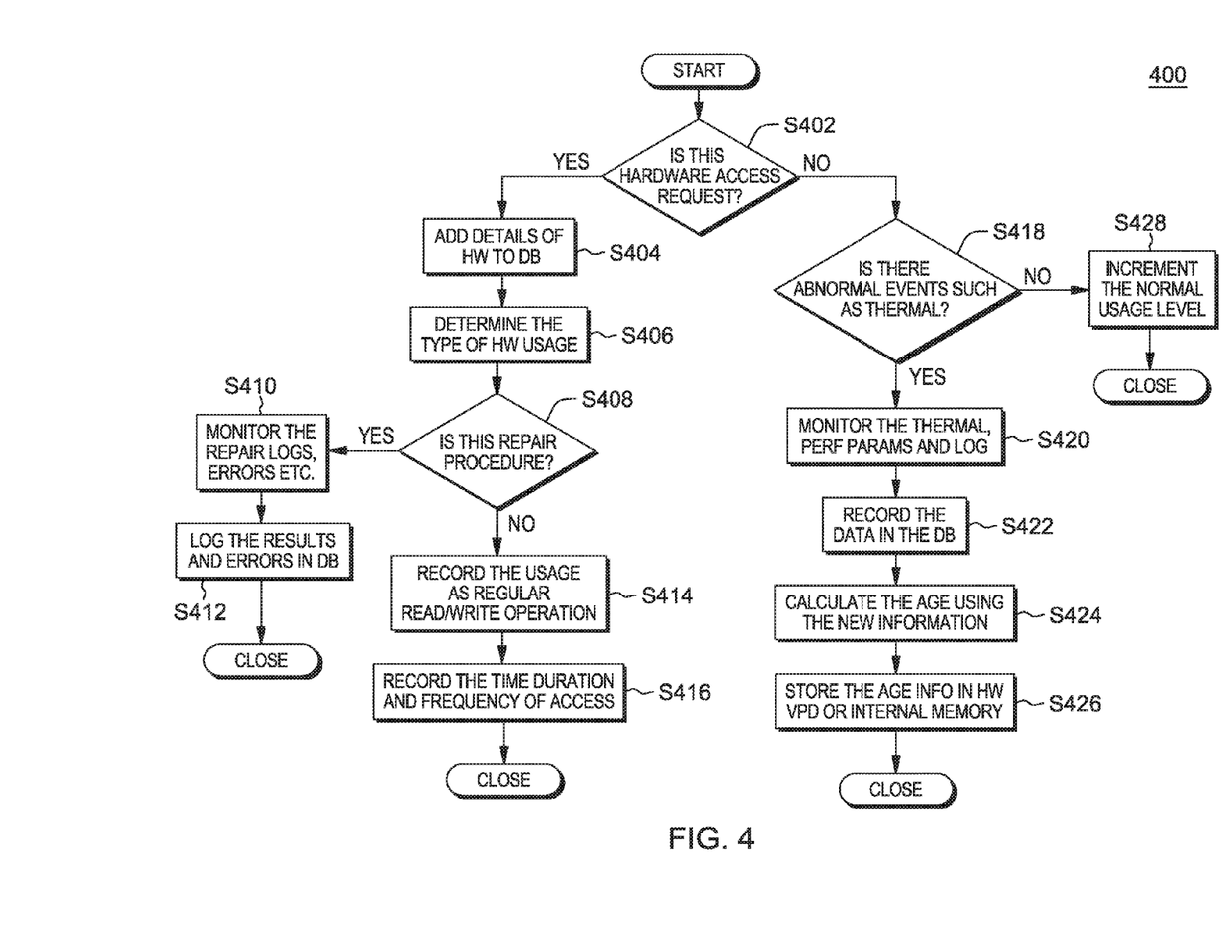
FIG. 4 is a flowchart showing a method performed according to an embodiment of the present invention.
Figure 5:
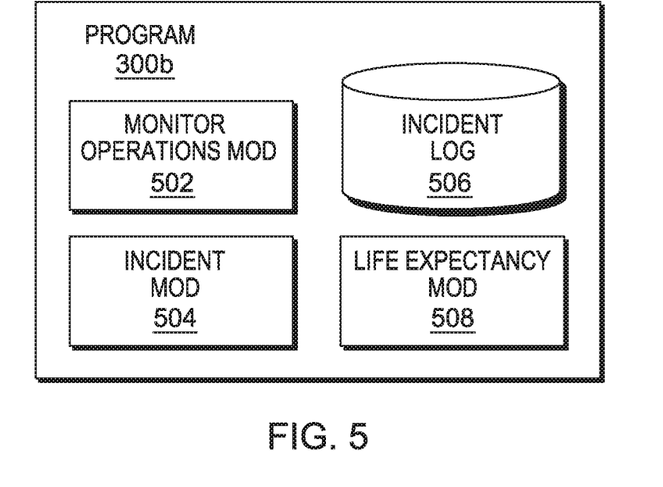
FIG. 5 is a schematic view of a machine logic (for example, software) portion according to an embodiment of the present invention for performing the method shown in FIG. 4.

FIG. 4 shows flowchart 400 depicting a second method according to an embodiment of the present invention. FIG. 5 shows program 300b for performing at least some of the method steps of flowchart 400. Program 300*b* is another embodiment of program 300 shown in FIG. 1. This method and associated software will now be discussed, over the course of the following paragraphs, with extensive reference to FIG. 4 (for the method step blocks) and FIG. 5 (for the software blocks). Program 300*b* may be implemented on any operating system, for example: the operating system active on a partition, on the hardware management console, on a network switch, or on a storage controller.

Processing begins at step S402, where monitor operations module 502 determines whether a detected incident is a hardware access request. If the detected incident is not a hardware access request, processing proceeds to step S418, discussed further below. If the detected incident is a hardware access request, processing proceeds to step S404.

Processing proceeds to step S404, where incident module 504 determines what hardware is associated with the detected event. That is, multiple hardware components may be affected by the detected event, so the incident module determines which hardware components should be considered for an age adjustment. Incident module 504 records the determined associated hardware in incident log 506.

Processing proceeds to step S406, where monitor operations module 502 determines the type of hardware usage that corresponds to the detected incident. Types of hardware usages include: (i) repairs; and (ii) read/write operations.

Processing proceeds to step S408 where monitor operations module 502 determines whether or not processing should proceed as a repair procedure incident. If processing should not proceed as a repair procedure, processing proceeds to step S414, discussed further below. If the type of hardware usage involves a repair procedure, processing proceeds to step S410.

Processing proceeds to step S410, where monitor operations module 502 monitors the repair procedure. Monitoring the repair procedure includes: (i) monitoring the repair logs; and (ii) monitoring the error codes.

Processing proceeds to step S412, where incident module 504 logs the results and any errors in incident log 506. As discussed at length above, the results and errors logged into the incident log are used to determine an adjusted age for each hardware component associated with recorded incidents.

Returning to step S408, where it is determined that processing should not proceed as a repair procedure, processing proceeds to step S414, where incident module 504 records the detected usage incident as a regular read/write operation in incident log 506.

Processing proceeds to step S410, where incident module 504 records hardware access data including: (i) duration of access; and/or (ii) frequency of access.

Returning to step S402, where the detected incident is not a hardware access request, processing proceeds to step S418, where monitor operations module 502 determines whether or not the detected incident is an abnormal event, such as a thermal deviation. If the detected event is not an abnormal event, processing proceeds to step S428, discussed further below. If the detected event is an abnormal event, processing proceeds to step S428.

Processing proceeds to step S420, where monitor operations module 502 monitors the detected event for incident data. Monitoring for incident data includes: (i) checking the error logs; (ii) checking the performance statistics; and/or (iii) checking the thermal parameters.

Processing proceeds to step S422, where incident module 504 records incident data in incident log 506. Incident data related to an abnormal event includes: (i) over-clocking; (ii) fan failure; (iii) over-volting; (iv) high clock speeds; (v) high temperatures; (vi) power supply changes; (vii) variations in thermal conditions; (viii) voltage changes; (ix) frequency changes; (x) input power fluctuations; (xi) hardware misconfigurations; (xii) improper seating of hardware components; (xiii) improper cabling; (xiv) hot reboots; (xv) shock warnings; (xvi) over-temperature warnings; (xvii) simultaneous failure of multiple components; (xviii) abnormal shut-downs; (xix) link stabilization time; (xx) hard disk motor failure; (xxi) clogged air intake filter; (xxii) malfunctioning air intake filter; and/or (xxiii) power cycling while partitions are up and running.

Processing proceeds to step S424, where life expectancy module 508 calculates the age using the recorded incident data from Step S422. The precise age adjustment depends on the tolerance of each system being monitored. A predetermined age adjustment count is associated with each failure mode for which monitor operations mod 502 is monitoring.

Processing ends at step S426, where life expectancy module 508 stores age information in the hardware VPD or internal memory. Age information may include one, or more, of the following: (i) calculated age; and/or (ii) incident data.

Figure 6:
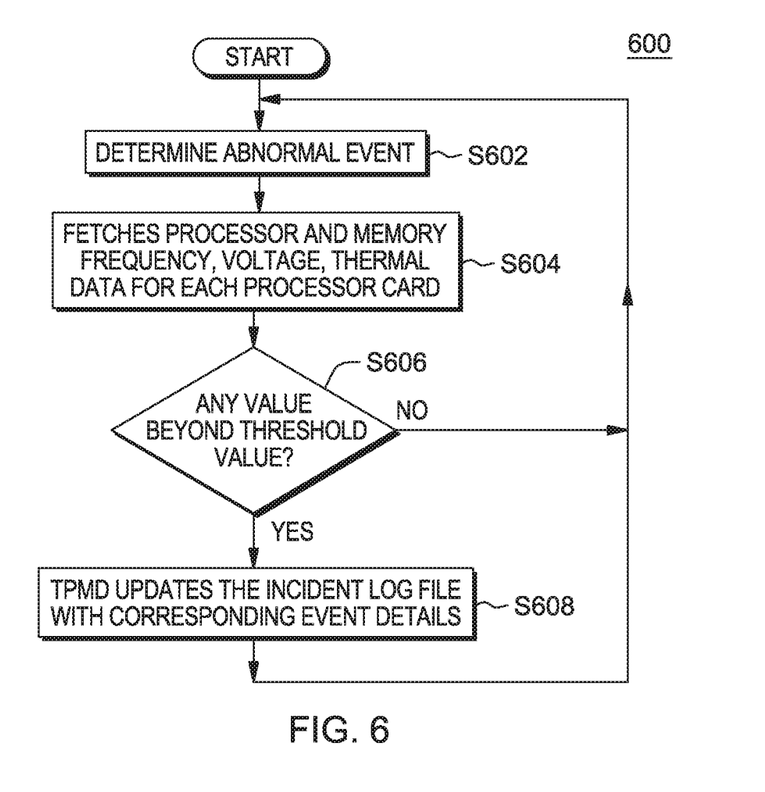
FIG. 6 is a flowchart showing a method performed according to an embodiment of the present invention.
Figure 7:
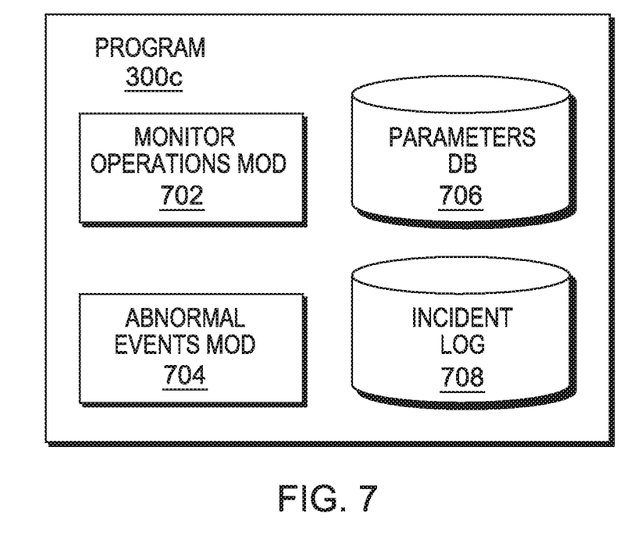
FIG. 7 is a schematic view of a machine logic (for example, software) portion according to an embodiment of the present invention for performing the method shown in FIG. 6.

FIG. 6 shows flowchart 600 depicting a method according to an embodiment of the present invention. FIG. 7 shows program 300*c* for performing at least some of the method steps of flowchart 600. Program 300*c* is yet another embodiment of program 300 shown in FIG. 1. This method and associated software will now be discussed, over the course of the following paragraphs, with extensive reference to FIG. 6 (for the method step blocks) and FIG. 7 (for the software blocks). Program 300*c* may be implemented on any operating system, for example: the operating system active on a partition, on the hardware management console, on a network switch, or on a storage controller.

Processing begins at step S602, where monitor operations module 702 determines that a detected incident is an abnormal event. This step may be compared to the "yes" branch of decision step S418 of flowchart 400 of FIG. 4.

Processing proceeds to step S604, where abnormal events module 704 fetches parameter data for each processor card from parameters database 706 and collects incident data. Parameter data may include one, or more, of the following threshold information: (i) processor frequency; (ii) memory frequency; (iii) operating voltage; and/or (iv) thermal characteristics. Incident data related to an abnormal event includes: (i) over-clocking; (ii) fan failure; (iii) over-volting; (iv) high clock speeds; (v) high temperatures; (vi) power supply changes; (vii) variations in thermal conditions; (viii) voltage changes; (ix) frequency changes; (x) input power fluctuations; (xi) hardware misconfigurations; (xii) improper seating of hardware components; (xiii) improper cabling; (xiv) hot reboots; (xv) shock warnings; (xvi) over-temperature warnings; (xvii) simultaneous failure of multiple components; (xviii) abnormal shut-downs; (xix) link stabilization time; (xx) hard disk motor failure; (xxi) clogged air intake filter; (xxii) malfunctioning air intake filter; and/or (xxiii) power cycling while partitions are up and running.

Processing proceeds to step S606, where abnormal events module 704 determines whether any incident data is outside any threshold value according to the fetched parameter data. If no incident data is outside of any threshold value, processing returns to step S602 where a "no" decision branch may be followed. For example, step S428 of flowchart 400 in FIG. 4 follows a "no" decision of step S418, so processing in this example may proceed similarly where no incident data is outside of any threshold value. If any incident value is outside any threshold value, processing proceeds to step S608.

Processing ends at step S608, where abnormal events module 704 updates incident log 708 with corresponding incident data. As discussed herein, the updated incident data provides the basis for revising the life expectancy value for one, or more, hardware components.

Some embodiments of the present invention may include one, or more, of the following features, characteristics and/or advantages: (i) tracks the nature of the physical stress subjected to component hardware; (ii) tracks the overall usage of a hardware component from date of manufacture; (iii) tracks the types of environments and/or conditions in which a hardware component is used; (iv) a mechanism to detect the physical stress, usage instances, and/or activities and conditions that affect the lifetime, fatigue and performance of the hardware component; (v) a mechanism to track the physical stress, usage instances, and/or activities and conditions that affect the lifetime, fatigue and performance of the hardware component; (vi) a mechanism to record the physical stress, usage instances, and/or activities and conditions that affect the lifetime, fatigue and performance of the hardware component; (vii) provides a user with observation data necessary to predict hardware failures; (viii) provides a user with observation data necessary to take corrective action in advance of hardware failures; (ix) a comprehensive mechanism to track the life expectancy of hardware components for more accurate predictions of failure; (x) improves resiliency and reduces maintenance efforts for software and hardware platforms; (xi) a mechanism to track health and life expectancy related data for individual hardware components, across frames and machines; (xii) updates estimated life expectancy of hardware components using life expectancy models that incorporate observation data into the life expectancy calculation; (xiii) supplying life expectancy data to consumers for decision making; (xiv) supplying the life expectancy data to an operating system to support workload placement decisions; (xv) defines a new method to track and record the characteristics affecting the life expectancy of a hardware component; (xvi) enables an easier and a more reliable way to predict the lifetime and eventual failure of any hardware component; (xvii) tracks the performance of a hardware component; (xviii) determines the cause(s) of the deterioration of a hardware component; (xix) reduces unnecessary expenditure incurred in premature hardware replacements due to faulty analysis; (xx) simplifies service planning; and/or (xxi) reduces outages in data centers of ever increasing size.

Some embodiments of the present invention may include one, or more, of the following features, characteristics and/or advantages: (i) active health monitoring on a machine to manage health and life expectancy related data of hardware modules; (ii) collates health and life expectancy events from various sources, including hardware control units, temperature sensors and error logs; (iii) determines the cause or effect of health and life expectancy events with relation to or on registered hardware modules; (iv) updates the health and life expectancy related VPD of hardware modules; (v) storing observation data about health and life expectancy related events that affect the health and expected lifetime of components of a hardware module in a persistent way that persists across transfer between machines; (vi) a hardware module, such as a power node, power book, mother board, adapter card, I/O unit, stores events that affect the health and life expectancy of components in persistent storage on the hardware module; (vii) after transfer of the hardware module to a different machine, the health and life expectancy related VPD is read by and further processed on the different machine; (viii) content of health and life expectancy related VPD, includes an event log of events such as: power on/offs, hot swaps, voltage, frequency changes, and temperature changes; (ix) one or more life expectancies for a device, each calculated according to a specific model for the life expectancy of hardware components; (x) integration of the hardware health monitoring system with a central database and data mining facility; (xi) updates a central database and data mining facility with failures of monitored hardware units under certain condition; (xii) statistical analysis is performed on collected data from many machines to generate and/or improve models for the life expectancy of components; (xiii) the central database and data mining facility updates the health monitoring systems of servers with newly generated and/or changed models; (xiv) the health monitoring systems of servers update the health and life expectancy related VPD; (xv) exports health and life expectancy related VPD to consumers such as the partition operating system or hypervisor; (xvi) supports decisions of consumers of health and life expectancy related VPD, such as a partition operating system, VIO server, and hypervisor to increase the lifetime of hardware components or resiliency of hosted workloads; (xvii) supports classifying hosted workloads into resiliency tiers; (xviii) supports assigning hardware components to workloads according to their health and life expectancy; (xix) supports classifying hardware according to the type and characteristics of degradation; (xx) supports running each class of hardware according to customized run time parameters to increase expected age and lifetime of a device; (xxi) supports deploying a workload to least-aged hardware to reduce the probability of disruptions due to hardware failure; and/or (xxii) recommends schedule(s) for hardware component replacement.

What is claimed is:

1. A method for estimating a remaining life expectancy value for hardware components used in a computing system, the method comprising:
   detecting a hot reboot of the computing system affecting a life expectancy of a first hardware component during an operation of the computing system;
   determining a set of hardware components in the computing system including the first hardware component and a second hardware component, each hardware component of the set of hardware components having a corresponding current life expectancy value affected by the hot reboot;
   adjusting the corresponding current life expectancy value of each hardware component in the set of hardware components to a remaining life expectancy value based on a predicted impact of the hot reboot on the life expectancy of each hardware component;
   generating a health report for a first hardware component in the set of hardware components, and
   determining an allocation of a workload within the computing system according to the remaining life expectancy values of the set of hardware components;
   wherein:
   at least the determining and adjusting steps are performed by computer software running on computer hardware.

2. The method of claim 1 further comprising:
   storing the health report in a vital product data store in a memory of the first hardware component.

3. The method of claim 1 further comprising:
   estimating a remaining life expectancy value based, at least in part, on the reduced life expectancy value.

4. The method of claim 1, further comprising:
responsive to detecting a physical shock by receiving a physical shock warning, adjusting the remaining life expectancy value of the first component based on a predicted impact of the physical shock on the remaining life expectancy value of the first component.

5. A computer program product for estimating a remaining life expectancy value for hardware components used in a computing system, the computer program product comprising a computer readable storage medium having stored thereon:
first program instructions to detect a hot reboot of the computing system affecting a life expectancy of a first hardware component during an operation of the computing system;
second program instructions to determine a set of hardware components in the computing system including the first hardware component and a second hardware component, each hardware component of the set of hardware components having a corresponding current life expectancy value affected by the hot reboot;
third program instructions to adjust the corresponding current life expectancy value of each hardware component in the set of hardware components to a reduced life expectancy value based on a predicted impact of the hot reboot on the life expectancy of each hardware component;
fourth program instructions to generate a health report for a first hardware component in the set of hardware components; and
fifth program instructions to determine an allocation of a workload within the computing system according to the remaining life expectancy values of the set of hardware components.

6. The computer program product of claim 5 wherein the computer program product further comprises a computer readable storage medium having stored thereon:
sixth program instructions to store the health report in a vital product data stored in a memory of the first hardware component.

7. The computer program product of claim 5 wherein the computer program product further comprises a computer readable storage medium having stored thereon:
sixth program instructions to estimate a remaining life expectancy value based, at least in part, on the reduced life expectancy value.

8. The computer program product of claim 5, wherein the computer program product further comprises a computer readable storage medium having stored thereon:
sixth program instructions to, responsive to detecting a physical shock by receiving a physical shock warning, adjust the remaining life expectancy value of the first component based on a predicted impact of the physical shock on the remaining life expectancy value of the first component.

9. A computer system for estimating a remaining life expectancy value for hardware components used in a computer system, the computer system comprising:
a processor(s) set; and
a computer readable storage medium;
wherein:
the processor set is structured, located, connected or programmed to run program instructions stored on the computer readable storage medium; and
the program instructions include:
first program instructions to detect a hot reboot of the computing system affecting a life expectancy of a first hardware component during an operation of the computing system;
second program instructions to determine a set of hardware components in the computing system including the first hardware component and a second hardware component, each hardware component of the set of hardware components having a corresponding current life expectancy value affected by the hot reboot;
third program instructions to adjust the corresponding current life expectancy value of each hardware component in the set of hardware components to a reduced life expectancy value based on a predicted impact of the hot reboot on the life expectancy of each hardware component;
fourth program instructions to generate a health report for a first hardware component in the set of hardware components; and
fifth program instructions to determine an allocation of a workload within the computing system according to the remaining life expectancy values of the set of hardware components.

10. The computer system of claim 9 wherein the program instructions further include:
sixth program instructions to store the health report in a vital product data stored in a memory of the first hardware component.

11. The computer system of claim 9 wherein the program instructions further include:
sixth program instructions to estimate a remaining life expectancy value based, at least in part, on the reduced life expectancy value.

12. The computer system of claim 9 wherein the program instructions further include:
sixth program instructions to, responsive to detecting a physical shock by receiving a physical shock warning, adjust the remaining life expectancy value of the first component based on a predicted impact of the physical shock on the remaining life expectancy value of the first component.

* * * * *